United States Patent [19]

Kouno et al.

[11] 4,205,340
[45] May 27, 1980

[54] CIRCUIT FOR MAKING A CRT DISPLAY A TV PICTURE FOR A COPY WITH DOTS SUPERPOSED ON HALF-TONE PICTURE AREAS

[75] Inventors: Akiyoshi Kouno; Masanobu Morishita; Yoshio Yui, all of Tokyo, Japan

[73] Assignee: Nippon Electric Co., Ltd., Tokyo, Japan

[21] Appl. No.: 844,982

[22] Filed: Oct. 25, 1977

[51] Int. Cl.$^2$ .................... H04N 5/84; H04N 1/40
[52] U.S. Cl. .................... 358/130; 358/283; 358/244
[58] Field of Search .................... 358/283, 298, 244, 6, 358/130–132, 75

[56] References Cited

U.S. PATENT DOCUMENTS

| 3,715,475 | 2/1973 | Prause et al. | 358/283 |
| 3,739,084 | 6/1973 | Heinrich | 358/283 |

Primary Examiner—John C. Martin
Attorney, Agent, or Firm—Hopgood, Calimafde, Kalil, Blaustein & Lieberman

[57] ABSTRACT

In order to make a cathode-ray tube display a television picture for providing a copy thereof, as in a computer output device, a circuit produces dot-superposed signals for those portions of a television signal which provide half-tone areas of the picture. For a color television signal, the dot-superposed signals are derivable by storing the television signal for one field of frame and repeatedly reading the stored signal. The read-out signals are preferably emphasized at the subcarrier frequency. For a monochrome television signal, a signal is generated and inversed. For a generated signal of an even multiple of the horizontal scanning frequency, a phase-adjusted signal is produced by selecting either the generated signal in every other line period of the respective frames and the inversed signal in the remaining line periods or the generated and inversed signals in every other field and the remaining fields, respectively. For a generated signal of an odd multiple of the line frequency, the phase-adjusted signal is produced by selecting the generated and inversed signals in every other frame and the remaining frames. Responsive to the phase-adjusted signal, the television signal is modulated to have a maximum amplitude at the black and white levels and a minimum amplitude at the above-mentioned portions. For modulation, the television signal may be preliminarily modified to have a minimum level at the black and white levels and a maximum level at a level bisecting the black and white levels.

12 Claims, 21 Drawing Figures

CIRCUIT FOR MAKING A CRT DISPLAY A TV PICTURE FOR A COPY WITH DOTS SUPERPOSED ON HALF-TONE PICTURE AREAS

BACKGROUND OF THE INVENTION

This invention relates to a circuit for use in a copying device comprising a cathode ray tube.

A device of the type described is used in a computer output printer, a display printer, and so forth to get a monochrome copy of a picture displayed on a cathode ray tube by a signal of the type similar to a monochrome television signal. The signal to which the device is operable is herein called a television signal. The picture is recorded on a copying medium with an electrophotographic method to provide a hard copy, as called in the art, of the picture. With the electrophotographic method, unevenness is inevitable on a recorded image reproduced on the copying medium due to the nature of a toner, and so on as will later be described with reference to one of the figures of the accompanying drawing. As a result, the copy is visually noisy and of a hard or sharp and unpleasing contrast.

SUMMARY OF THE INVENTION

It is therefore an object of this invention to provide a circuit responsive to a television signal for making a cathode-ray tube of a copying device display a picture so as to provide a hard copy of the picture with halftone areas faithfully copied.

It is another object of this invention to provide a circuit of the type described wherein the halftone areas are copied like the halftone process known in printing without the use of a crossline screen.

It is a further object of this invention to provide a circuit of the type applicable to a color television signal circuit comprising subcarrier signals modulated by chrominance components.

It is a yet further object of this invention to provide another circuit wherein a horizontal synchronizing signal is utilized to produce the dotted-areas.

A circuit according to this invention is for use in a device comprising a cathode-ray tube responsive to a cathode-ray tube input signal for displaying a picture and means for forming a monochrome copy of said picture on a copying medium. The circuit is responsive to a sequence of discrete signal blocks included in a television signal for producing said cathode-ray tube input signal. The television signal comprises vertical synchronizing signals at a first predetermined period, horizontal synchronizing signals between two adjacent ones of the vertical synchronizing signals at a second predetermined period, and luminance components between two adjacent ones of the horizontal synchronizing signals. The signal blocks have signal levels variable between a first and a second level, said first and second levels inclusive. Each of the signal blocks comprises the luminance components included in the television signal in a preselected interval longer than the second predetermined period and not longer than twice the first predetermined period. The picture has luminance levels dependent on the cathode-ray tube input signal. According to this invention, the circuit comprises first means responsive to at least one of the signal blocks for producing a dot-superposed signal, the dot-superposed signal being produced for those portions of the signal blocks which have the signal levels intermediate between the first and second levels and second means for delivering the dot-superposed signal from the first means as the cathode-ray tube input signal.

DESCRIPTION OF THE PREFERRED EMBODIMENTS

Figure 1:
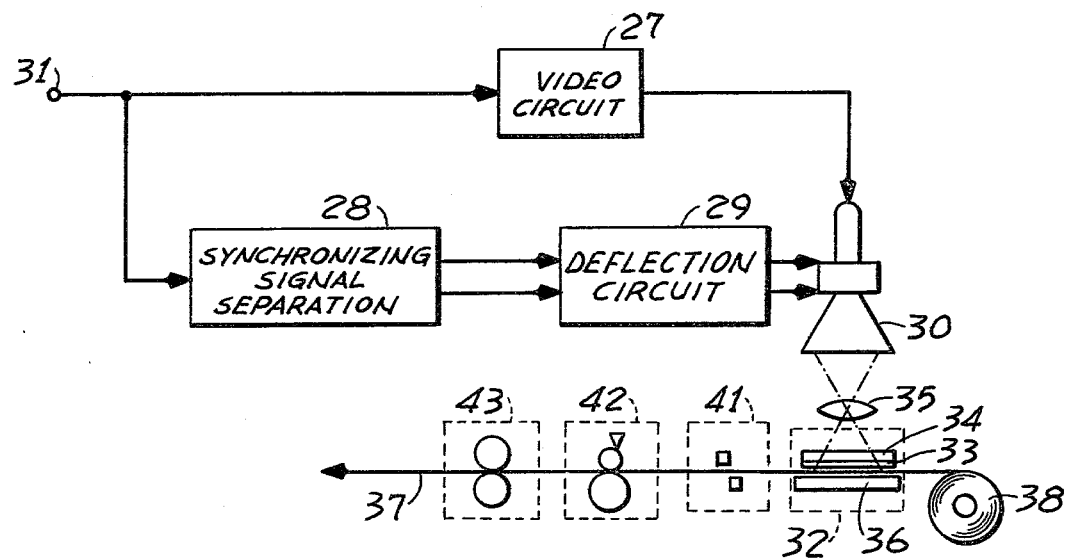
FIG. 1 is a block diagram of a conventional copying device comprising a cathode-ray tube and a circuit responsive to a television signal for making the cathode-ray tube display a picture to be copied.

Referring to FIG. 1, description will be made of a sophisticated copying device to facilitate an understanding of this invention. The sophisticated copying device comprises a video circuit 27, a synchronizing signal separation circuit 28, a deflection circuit 29, and a cathode-ray tube 30 responsive to a cathode-ray tube input signal for displaying a picture. The video circuit 27 is supplied with a monochrome television signal through an input terminal 31 so as to deliver the cathode-ray tube input signal to the cathode-ray tube 30. The copying device is supplied with a sequence of discrete signal groups or blocks each of which is representative of a frame or a field equal to a half of the frame. The monochrome television signal comprises vertical synchronizing signals V at a first predetermined period of, for example, 1/60 second, and horizontal synchronizing signals H between two adjacent ones of the vertical synchronizing signals at a second predetermined period of, for example, 1/15,750 second. The monochrome television signal further comprises luminance components between two adjacent ones of the horizontal synchronizing signals. The discrete signal groups thus have signal levels variable between a first and a second level representative of a white and a black level, respectively. Supplied with the monochrome television signal, the synchronizing signal separation circuit 28 separates the vertical and horizontal synchronizing signals V and H to put the deflection circuit 29 into operation. As a result, the cathode-ray tube 30 visually displays the picture in response to every signal group with luminance levels dependent on the cathode-ray tube input signal. With a recording portion 32, the picture on the cathode-ray tube 30 is optically exposed on a photoconductive layer 33 of a photosensitive plate 34 through an optical system 35. Opposed to the photosensitive plate 34, a backward electrode 36 is located with a spacing left therebetween. Between the photosensitive plate 34 and the backward electrode 36, a copying medium 37, such as an electrostatic recording paper, is supplied from a roll 38. A high voltage of, for instance, several hundred volts is impressed between the plate 34 and electrode 36 to produce on the copying medium 37 an electrostatic latent image corresponding to the picture on the cathode-ray tube 30. The copying medium 37 is fed leftwards of this figure to be cut into a desired size at a cutter 41 after the production of electrostatic latent image at the recording portion 32. From the cutter 41, the copying medium of desired size is sent to a developing unit 42 and a fixing unit 43 to provide a fixed visible image, namely, a hard copy of the picture displayed by the cathode-ray tube. With an electrophotographic method described above, unevenness is inevitable on the visible image reproduced on the copying medium 37. This is because the copying medium 37 itself is not uniform in a surface state for humidity and so on. As a result, a developing agent irregularly adheres to the copying medium 37 even when uniform exposure is made on the copying medium 37. In addition, a toner used in the developing unit 42 is liable to accumulate in direct proportion to electric potentials on the copying medium. Therefore, the electrophotographic method is defective in that the reproduction of halftone areas of the picture is difficult in addition to the unevenness of the visible image.

Figure 2:
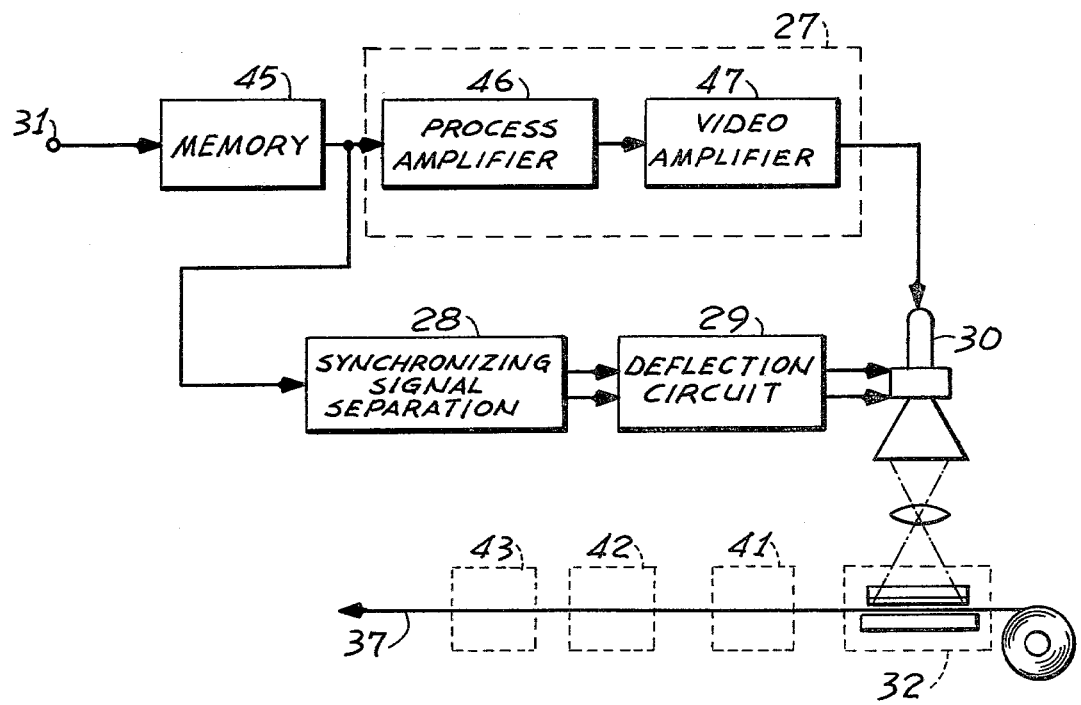
FIG. 2 is a block diagram of a copying device including a circuit according to a first embodiment of this invention.

Referring now to FIG. 2, a circuit according to a first embodiment of this invention is for making a cathode-ray tube 30 display a picture to provide a hard copy of the picture with halftone areas faithfully reproduced. The circuit is supplied from an input terminal 31 with a color television signal instead of a monochrome television signal. The color television signal comprises luminance components, subcarrier signals of a subcarrier frequency modulated by chrominance components, and horizontal and vertical synchronizing signals. The subcarrier frequency is usually of an odd multiple of a line scanning frequency, namely, an inverse number of the second predetermined period for compatibility between the monochrome and color television signals. In other words, the subcarrier signals are inverted in phase at two adjacent ones of the frames. As is the case with the monochrome television signal, a hard copy is provided with the electrophotographic method even when the color television signal is visually displayed on a monochrome or a color television receiving cathode-ray tube. No influence of the subcarrier signals appears on the copy due to an integration effect during a comparatively long exposing period.

It is known in printing that halftones of visible images are substantially realized by a halftone process with the use of a crossline screen. When the halftone process is applied to the cathode-ray tube, reduction inevitably occurs in sensitivity of the copy because the cathode-ray tube is covered by the crossline screen. In addition, no visible image is copied at portions where the crosslines of the screen are superposed to the scanning lines of the picture image on the cathode-ray tube. In order to avoid the above defects, a complicated technique such as wobbling is indispensable to shift a beam spot.

In the embodiment being illustrated with reference to FIG. 2, the subcarrier signals are effectively utilized for the reproduction of halftone areas of the picture by resorting to the so-called halftone block effect. The circuit comprises a memory 45 for storing one group of the color television signal having a preselected interval equal to either one frame or one field period besides the video circuit 27, the synchronizing signal separation circuit 28, and the deflection circuit 29. It is needless to say that the preselected interval of the signal group is longer than the second predetermined period of the horizontal synchronizing signals and not longer than twice the first predetermined period of the vertical synchronizing signals. For the embodiment, the video circuit 27 further comprises a process amplifier 46 and a video amplifier 47 for delivering the cathode-ray tube input signal to the cathode-ray tube 30. The process amplifier 46 has functions of automatic gain control, negative to positive inversion, d.c. regeneration, and so forth. As described in conjunction with FIG. 1, the copying device comprises a recording portion 32, a cutter 41, a developing unit 42, and a fixing unit 43. The memory 45 is capable of repeatedly producing the signal group stored therein. Use may be made of a scan converter tube, a magnetic disk device, a magnetic drum device, a semiconductor memory device, a magentic core device, a wire memory device, a CCD device, and so forth to store one field or one frame of the television signal.

In operation, the signal group stored in the memory 45 through an input line arriving thereat from the input terminal 31 is repeatedly read out through an output line leading therefrom to the video circuit 27 to make the cathode-ray tube 30 display a static picture. In the repeatedly read-out signal groups, the modulated subcarrier signals are inphase. This provides the above-mentioned halftone block effect a halftone areas of the picture, resulting in substantially no halftone block effect at highlight and black areas of the picture. Due to the halftone block effect, dot-superposed components are produced in the repeated read-out signal for those portion of the signal groups which have the signal levels intermediate between the first and second levels. The signal produced from the memory 45 is herein called a dot-superposed signal. It is to be mentioned here that the "dot" used in the "dot-superposed components" and "dot-superposed signal" means the fact that dots are superposed on the static picture when the dot-superposed signal is supplied to the cathode-ray tube 30 through the video circuit 27. The cathode-ray tube 30 displays the picture having luminance levels dependent on the cathode-ray tube input signal and enables the recording portion 32 produce a latent image similar to the picture on a copying medium 37. Inasmuch as the static dots appears on the picture due to the subcarrier signals, the latent image on the copying medium 37 has dotted electrical potential distribution corresponding to the static dots. The copying medium 37 is supplied to the developing unit 42 after cut into a desired size at the cutter 41. The developing unit 42 develops the latent image with the use of a toner. The toner adheres also to portions having dotted electrical potentials to reproduce dotted visible images on the copying medium 37. Adhesions of the toner are proportional to gradients of the electrical potentials on the copying medium 37. As a result, halftone areas of the picture are considerably faithfully copied on the copying medium 37 in the form of dots or spots to be visually recognized as halftone areas.

Figure 3:
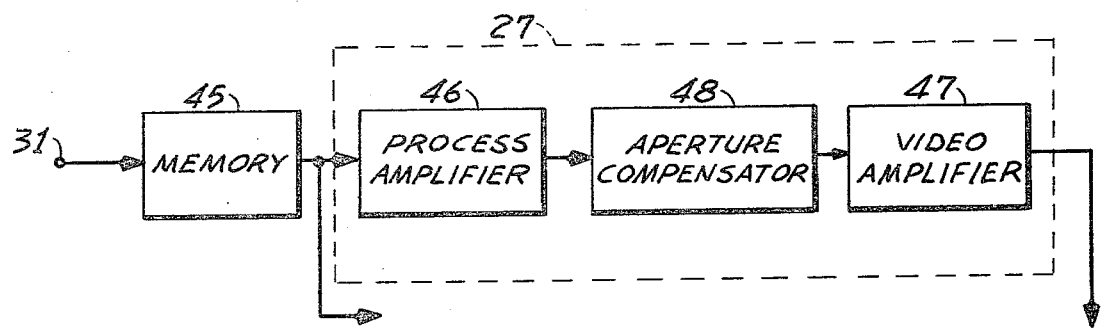
FIG. 3 is a block diagram of a video circuit used in the circuit illustrated in FIG. 2.

Referring to FIG. 3, a modified video circuit 27 which is applicable to the first embodiment comprises an aperture compensator 48 between the process amplifier 46 and the video amplifier 47. The aperture compensator 48 is for emphasizing modulated subcarrier signals of the color television signal at the subcarrier frequency. Supplied with repeatedly read-out signal groups from the memory 45 through the process amplifier 45, the aperture compensator 48 emphasizes the modulated subcarrier signals at the subcarrier frequency to produce an emphasized color television signal comprising modulated and emphasized subcarrier signals. The video amplifier 47 amplifies the emphasized color television signal to produce the dot-superposed signal emphasized at the subcarrier signals. The emphasized and dot-superposed signal is delivered to the cathode-ray tube 30.

Figure 4:
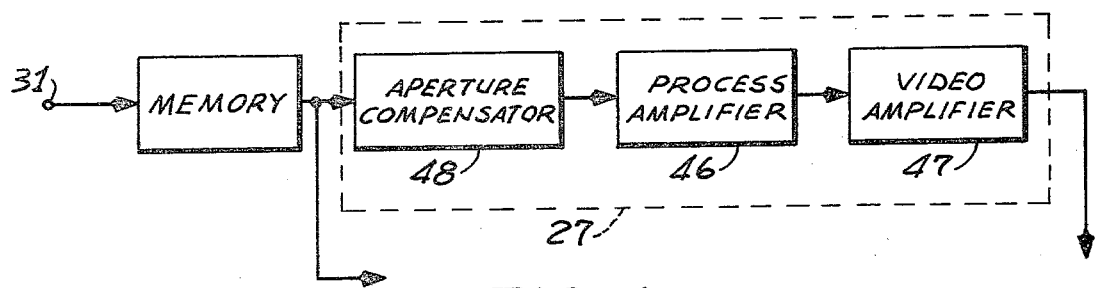
FIG. 4 is a block diagram of another video circuit used in the circuit illustrated in FIG. 2.

Referring to FIG. 4, another modified video circuit 27 comprises the aperture compensator 48 prior to the process amplifier 46. The aperture compensator 48 is directly supplied with the repeatedly read-out signal groups from the memory 45. Also in this arrangement, the video circuit 27 is capable of supplying as the dot-superposed signal the color television signal emphasized at the subcarrier frequency.

Figure 5:
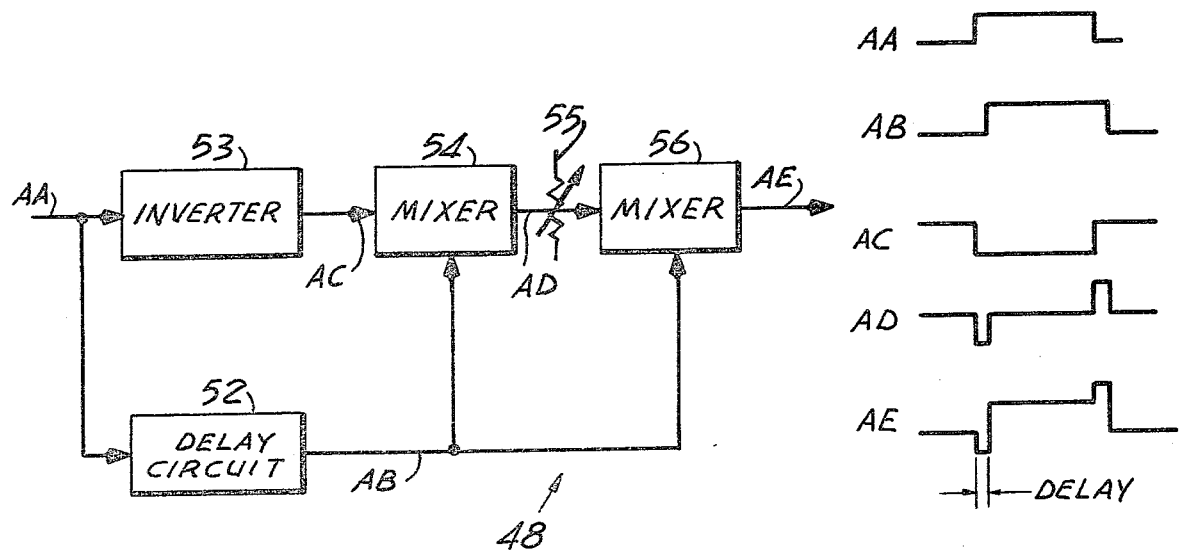
FIG. 5 is a block diagram of an aperture compensator used in the video circuits illustrated in FIGS. 3 and 4.
Figure 6:
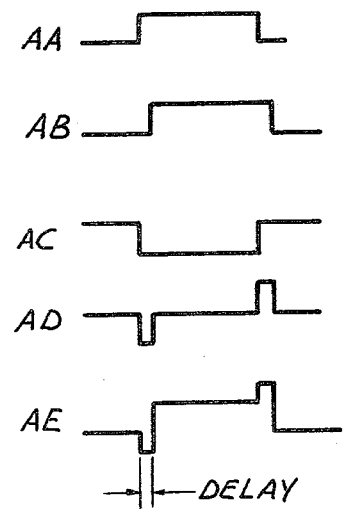
FIG. 6 is a schematic time chart of signals which appear in the aperture compensator illustrated in FIG. 5.

Referring to FIGS. 5 and 6, an aperture circuit 48 is applicable to the modified video circuits depicted in FIGS. 3 and 4, and is responsive to an input signal AA which is each of the repeatedly read-out color television signal groups. A delay circuit 52 gives the input signal a delay equal to a half of one cycle of the subcarrier frequency, namely, an inverse number thereof to produce a delayed signal. Supplied with the input signal AA, an inverter circuit 53 produces an inversed signal AC. The inversed and the delayed signals AB and AC are supplied to a first mixer 54 to produce a mixed signal component AD in which the subcarrier signal components are emphasized. The mixed signal component AD is supplied through an attenuator 55 to a second mixer 56 to produce as an output signal AE a color television signal comprising the modulated subcarrier signals emphasized at the subcarrier frequency. As is apparent from FIG. 6, the emphasized color television signal AE is emphasized at a component thereof corresponding to the delay time of the delay circuit 52 on a time axis. This means that the subcarrier frequency is emphasized within a frequency band.

Figure 7:
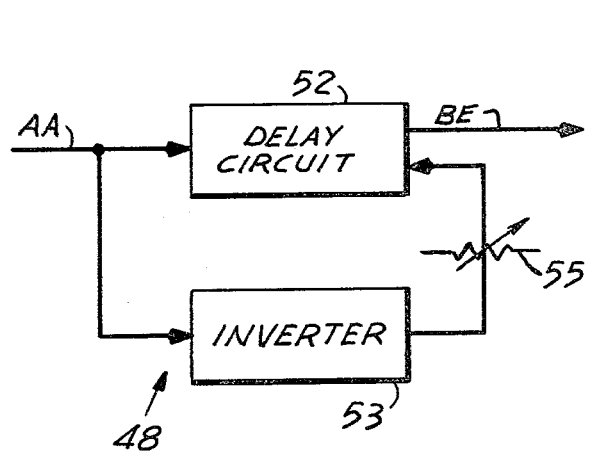
FIG. 7 is a block diagram of another aperture compensator used in the video circuit illustrated in FIGS. 3 and 4.
Figure 8:
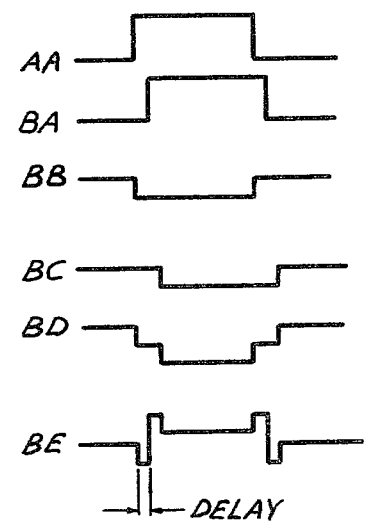
FIG. 8 is a schematic time chart of signals appearing in the aperture compensator illustrated with FIG. 7.

Referring to FIGS. 7 and 8, another aperture circuit 48 comprises a delay circuit 52 having a delay equal to that of the delay circuit shown in FIG. 6, an inverter circuit 53, and an attenuator 55. The delay circuit 52 has a first and a second terminal for giving the delay to a first input signal AA supplied to the first terminal to produce a first delayed signal BA from the second terminal. The first input signal AA is also supplied to the inverter 53 to produce an inverted signal BB supplied to the second terminal through the attenuator 55. The delay circuit 52 further gives twice the delay to the inverted signal BB to produce a second delayed signal BC from the second terminal. The first delayed signal BA, the inverted signal BB, and the second delayed signal BC are mixed at the second terminal of the delay circuit 52 to become an output signal BE comprising the modulated and emphasized subcarrier signal.

Figure 9:
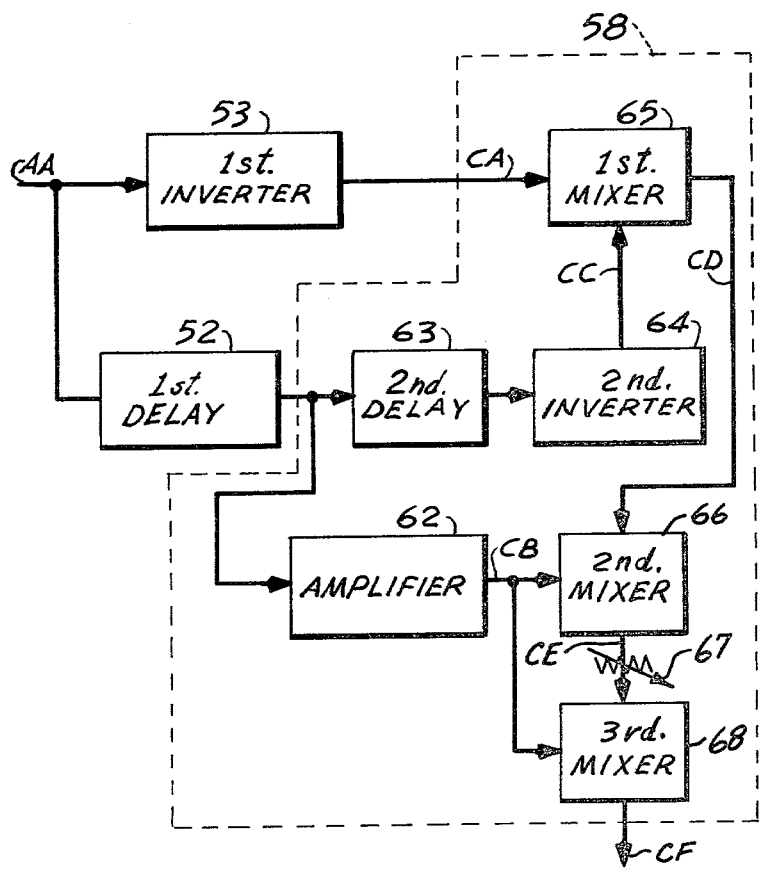
FIG. 9 is a block diagram of a further aperture compensator used in the video circuits illustrated in FIGS. 3 and 4.
Figure 10:
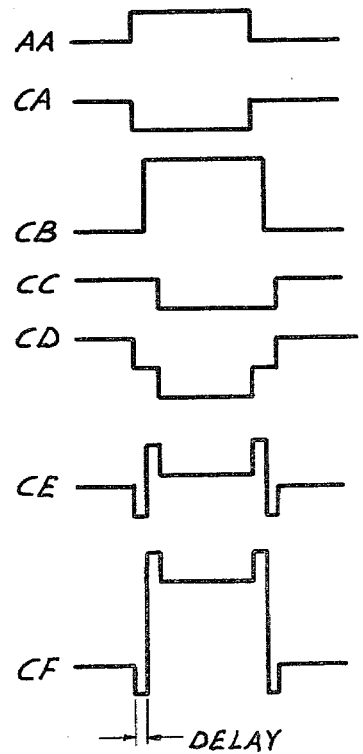
FIG. 10 is a schematic time chart of signals in the aperture compensator illustrated in FIG. 9.

Referring to FIGS. 9 and 10, a further aperture compensator 48 comprises a first delay circuit 52, a first inverter 53, and a mixing circuit 58. In this example, the mixing circuit 58 comprises an amplifier 62, a second delay circuit 63, a second inverter 64, a first mixer 65, a second mixer 66, an attenuator 67, and a third mixer 68 to produce an emphasized color television signal comprising a modulated and emphasized subcarrier signal. Supplied with the input signal AA, the first inverter 53 inverses the input signal AA to produce a first inversed signal CA supplied to the first mixer 65. The first delay circuit 52 delays the input signal AA by the delay equal to a half of the inverse number of the subcarrier frequency to produce a delayed input signal supplied to the second delay circuit 63 and the amplifier 62. An amplified and delayed input signal CB is supplied from the amplifier 62 to the second and third mixers 66 and 68. The second delay circuit 63 gives a delay equal to one of the first delay circuit 52 to the delayed input signal to produce a further delayed signal. Responsive to the further delayed signal, the second inverter 64 produces a second inversed signal CC supplied to the first mixer 65. Supplied with the first and second inversed signals CA and CC, the first mixer 65 derives a first mixing signal CD supplied to the second mixer 66. Responsive to the amplified and delayed input signal, the second mixer 66 mixes with the first mixing signal CD to produce a second mixing signal CE representative of a signal component to be emphasized. The second mixing signal CE is supplied through the attenuator 67 to the third mixer 68 to mix with the amplified and delayed input signal CB. As a result, the third mixer 68 supplies a third mixing signal CF representative of the color television signal emphasized at the subcarrier frequency.

The aperture compensator may consist of a boosting circuit having a frequency characteristic of boosting an input color television signal at the subcarrier frequency.

Figure 11:
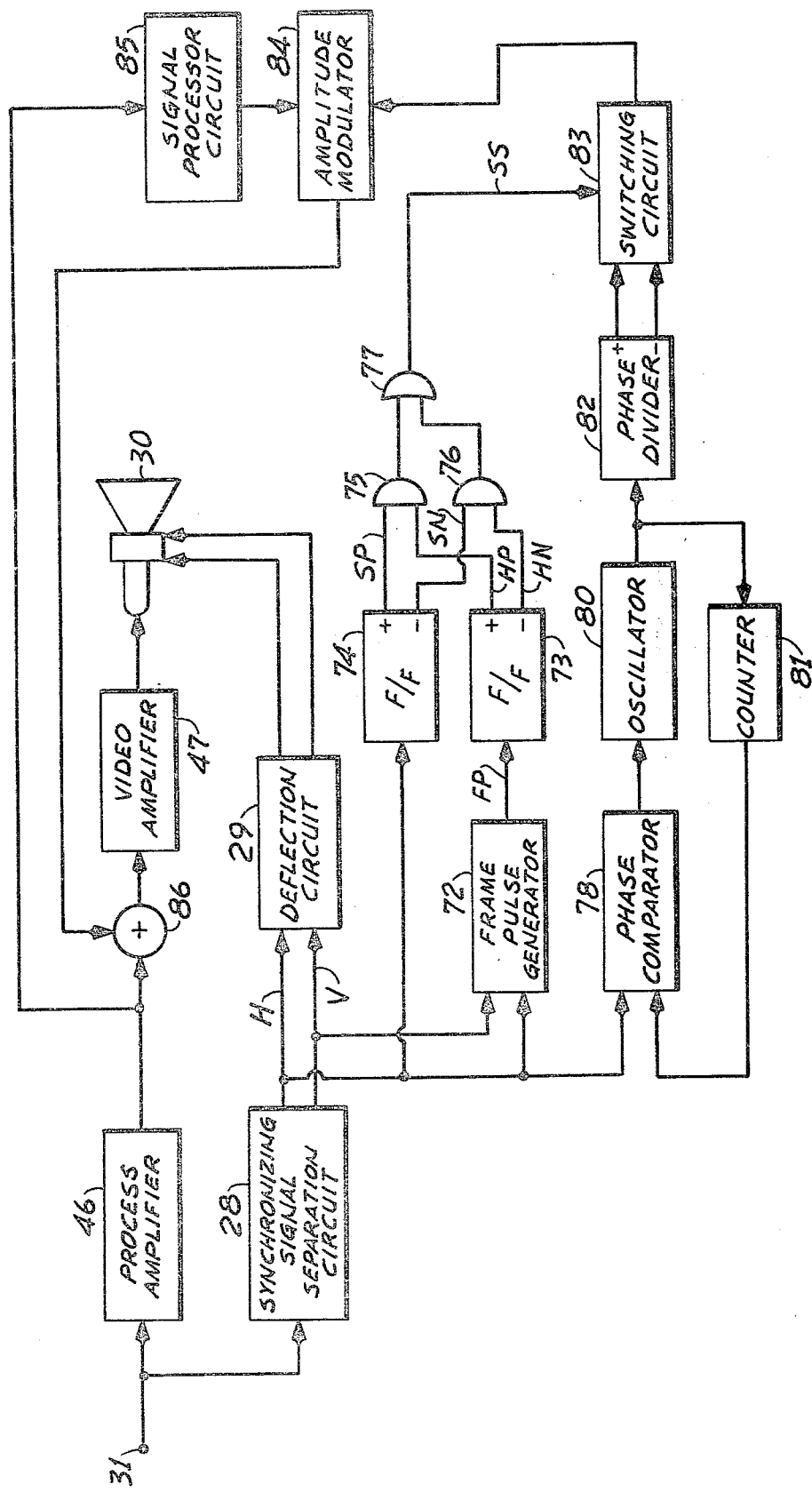
FIG. 11 is a block diagram of a circuit according to a second embodiment of this invention.
Figure 12:
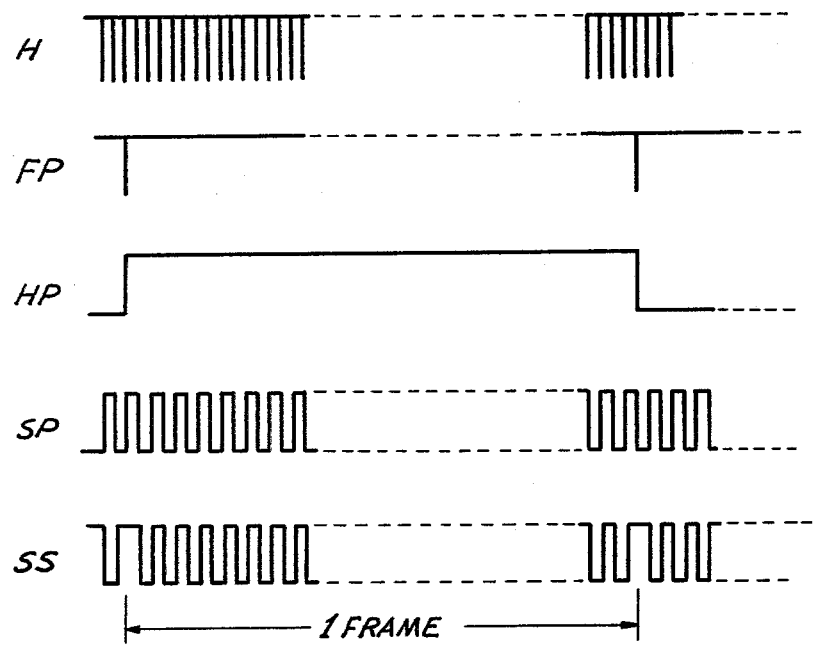
FIG. 12 is a schematic time chart of signals used in the circuit according to the second embodiment.

Referring to FIGS. 11 and 12, a circuit according to a second embodiment of this invention is supplied as an input signal with a monochrome television signal in which the first predetermined period is equal to a half of the frame period. In other words, the circuit receives the monochrome television signal for interlaced scanning. The circuit comprises a process amplifier 46, a video amplifier 47, a synchronizing signal separation circuit 28 and a deflection circuit 29, like the circuit illustrated with reference to FIG. 2. In this embodiment, a dot-superposed signal is produced by the use of horizontal synchronizing signals H instead of the subcarrier signals. Responsive to the input television signal from an input terminal 31, the synchronizing signal separation circuit 28 derives the vertical and horizontal synchronizing signals V and H supplied to the deflection circuit 29. The vertical and horizontal synchronizing signals V and H are also supplied to a frame pulse generator 72 to produce a frame pulse FP having a repetition frequency of the frame frequency, such as 30 Hz. Supplied with the frame pulse FP, a first flip-flop circuit 73 produces a positive- and a negative-going symmetrical rectangular pulse HP and HN having a repetition frequency equal to a half of that of the frame pulse FP through a positive and a negative terminal symbolized by plus and minus signs, respectively. The positive-going pulse HP is only shown in FIG. 12. The horizontal synchronizing signals H are supplied also to a second flip-flop circuit 74. The second flip-flop circuit 74 is set and reset by the horizontal synchronizing signals H to produce a positive- and a negative-going rectangular pulse SP and SN of a duty ratio of 50% and a repetition frequency (7.875 kHz) equal to a half of that of the horizontal synchronizing signals H. The positive-going rectangular pulse sequence SP is only depicted in FIG. 12. AND gates 75 and 76 are alternatively enabled by the positive-and negative-going rectangular pulses HP and HN at every frame period. During a certain frame period, the AND gate 75 makes the positive-going rectangular pulse SP of the second flip-flop circuit 74 pass through. During th next frame period, the AND gate 76 produce the negative-going rectangular pulse SN of the second flip-flop circuit 74. Responsive to outputs of the AND gates 75 and 76, an OR gate 77 produces a switching signal SS put in a first state in every other one of the second predetermined periods of the respective frame periods and in a second state in the remaining ones of the second predetermined periods. It will be understood that the switching signal SS has a pulse of a width equal to twice the second predetermined periods at each of the beginning of each frame period.

Further referring to FIG. 11, the horizontal synchronizing signal H is supplied to a phase comparator 78 to produce a control signal. Controlled by the control signal, an oscillator 80 produces an oscillation signal of an oscillation frequency substantially equal to an even integral multiple of a half of a line scanning frequency, namely, an inverse number of the second predetermined period. The oscillation signal is supplied to a counter 81 to be demultiplied by a factor equal to one by the even number. The integral number defines the number of dots to be superposed on the picture in each of the second predetermined periods. Therefore, the counter 81 supplies an output signal having a repetition frequency equal to that of the horizontal synchronizing signals H to the phase comparator 78. The output signal is phase compared with the horizontal synchronizing signal H at the comparator 78 to produce the control signal in compliance with phase differences therebetween. The oscillator 80 produces the oscillation signal in synchronism with the horizontal synchronizing signal H. In other words, the phase comparator 78, the oscillator 80, and the counter 81 are for automatic frequency control.

Responsive to the oscillation signal produced by the oscillator 80, a phase divider 82 produces a first and a second signal from a positive and a negative terminal designated by a plus and a minus sign, respectively. The second signal is antiphase relative to the first signal. Supplied with the switching signal SS, a switching circuit 83 selects as a phase-adjusted signal the first signal when the switching signal is put in the first state (or high level) and the second signal when the switching signal is put in the second state (or low level). As a result, the first signal is supplied from the switching circuit 83 in every other one of the second predetermined periods of the respective frame periods. The second signal is selected in the remaining ones of the second predetermined periods.

Figure 13:
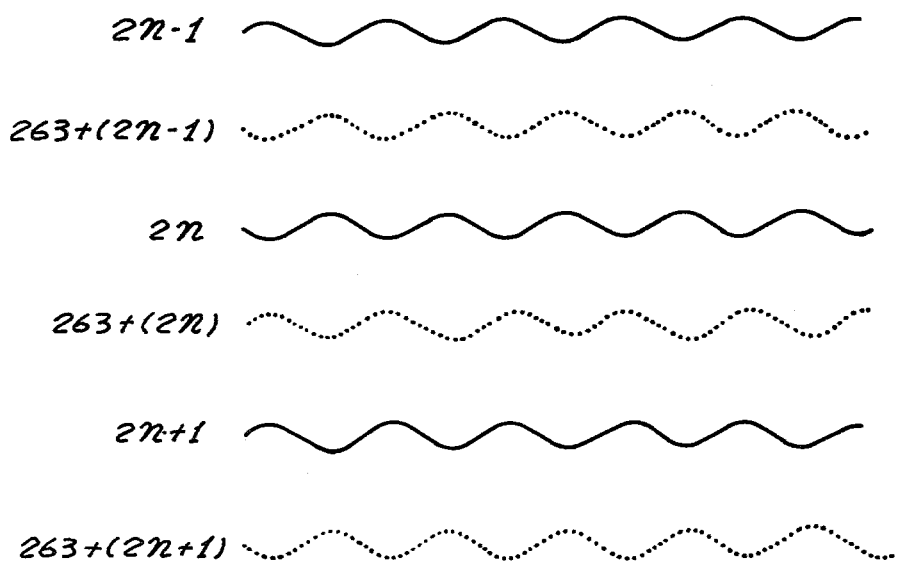
FIG. 13 is a schematic time chart of phase-adjusted signals used in the circuit according to the second embodiment.

Referring temporarily to FIG. 13, selection of the first and second signals is illustrated for one frame period with the first and second signals discriminated by the phase and with the first and second signals of one field of the frame represented by solid-line curves while the signals of the next succeeding field, by dashed-line curves. It is presumed that the first signal is selected during a (2n - 1)-th one of the second predetermined periods in compliance with the first state of the switching signal SS. As described hereinabove, the second signal is selected in the next following 2n-th one of the second predetermined periods in accordance with the second state of the switching signal SS. Inasmuch as each field period is equal in the present-day color television signal to the second predetermined period multiplied by an integer and a half, such as 262.5 for the NTSC system, it is possible to represent the second predetermined periods of the next subsequent field period by addition of 263 to the second predetermined period numbers. For simplicity of description, it is further assumed that the phase-adjusted signal alone is displayed on the cathode-ray tube 30. In the next succeeding frame, the phase-adjusted signal has the same phase as the phase-adjusted signal illustrated for one of the frames. Bright spots appear only at points where, for example, peaks of the phase-adjusted signals of the successive frames are coincident. Thus, the above-mentioned manner of selection of the first and second signals results in a staggered distribution of the bright spot pairs that is adequate for matching and copying.

Turning back to FIG. 11, the first and second signals selected as the phase-adjusted signal are supplied to an amplitude modulator 84. The modulator 84 is accompanied by a preliminary signal processor 85 described hereinunder and carries out amplitude modulation of the phase-adjusted signal in accordance with the signal groups to produce an amplitude modulated signal which has a minimum amplitude when the signal level of the signal groups reaches whichever of the first and second levels and otherwise a maximum amplitude. Inasmuch as the phase-adjusted signal makes the cathode-ray tube 30 display dots, the amplitude modulated signal provides the above-described dot-superposed components. A mixer 86 mixes the signal groups supplied from the process amplifier 46 and the amplitude modulated signal to supply the dot-superposed signal to the video circuit 47. As will be described later more in detail, the preliminary signal processor 85 is supplied with the television signal from the process amplifier 46 and produces a modified signal that has a maximum level at a preselected signal level intermediate between the first and second levels and otherwise levels lower than the maximum level. The preselected level may be a level bisecting the level difference between the first and second levels.

Figure 14:
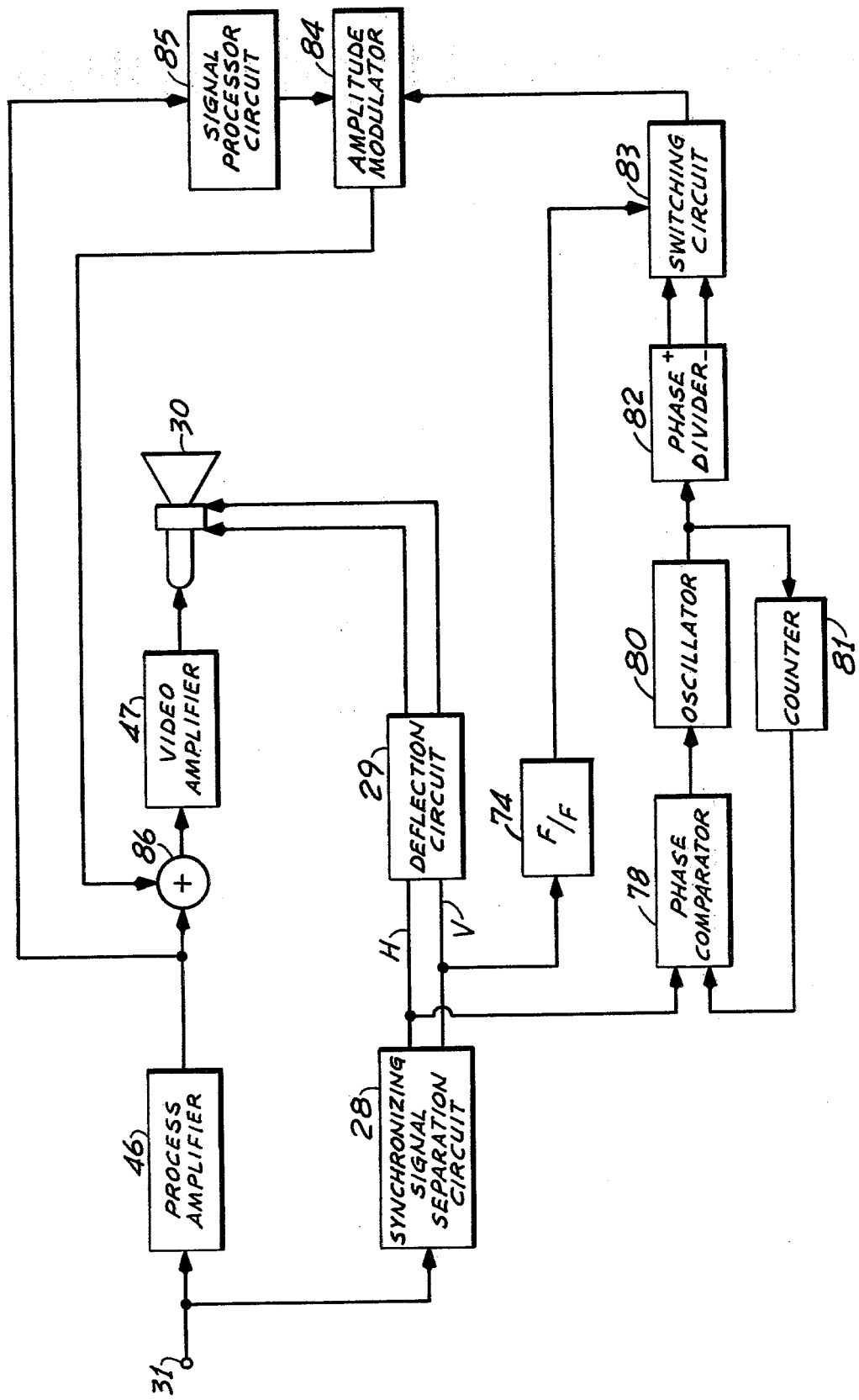
FIG. 14 is a block diagram of a circuit according to a third embodiment of this invention.

Referring to FIG. 14, a circuit according to a third embodiment of this invention is also for a monochrome television signal. Similar to FIG. 11, the circuit comprises an oscillator 80 for producing an oscillation signal of an oscillation frequency equal to an even integral multiple of a half of an inverse number of the second predetermined period. Other circuits and signals equivalent to those described in conjunction with FIG. 11 are designated by like reference symbols. Responsive to the vertical synchronizing signal V, a flip-flop circuit 74 is directly set and reset without the frame pulse generator 72 illustrated in FIG. 11 to produce a switching signal. The switching signal is put in the first state in every other field period of the television signal and in the second state in the remaining field periods. Supplied with the switching signal, the switching circuit 83 is switched at every field period to select one of the first and second signals from the phase divider 82. More particularly, the switching circuit 83 selects the first signal in the second predetermined periods of one of odd and even numbered field periods and the second signal in those of the other field. On the cathode-ray tube 30, dots of the first signal are displayed in staggered relation to dots of the second signal. Dot sizes are substantially equal to a half of the dot sizes produced by the circuit according to the second embodiment. Therefore, a higher resolution is accomplished with a circuit according to the third embodiment. It is, however, to be noted that the phase-adjusted signal has the same phase during a first half of each frame period and the inverted phase during a second half of the frame period. This results in, when the picture is watched, vertical bright stripes. In addition, the stripes are switched between ones and others at the field period. Therefore, the picture is not relevant to visual observation.

Figure 15:
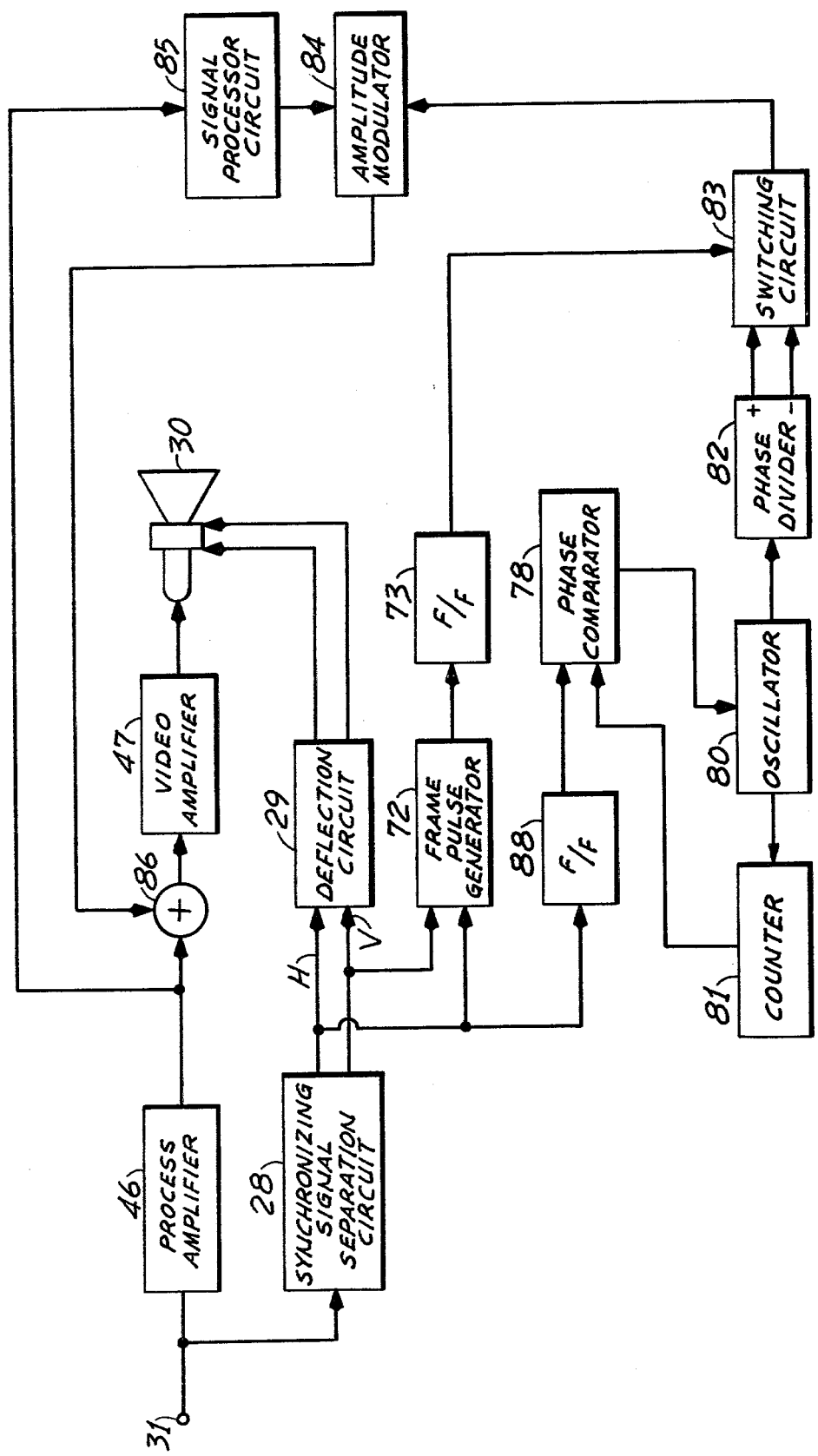
FIG. 15 is a block diagram of a circuit according to a fourth embodiment of this invention.

Referring to FIG. 15, a circuit according to a fourth embodiment of this invention is again for a monochrome television signal. The circuit comprises an oscillator 80 for producing an oscillation signal of an oscillation frequency equal to an odd integral multiple of a half of an inverse number of the second predetermined period. Elements and signals equivalent to those described in conjunction with FIG. 11 are designated by like reference symbols.

Responsive to the horizontal and vertical synchronizing signals V and H supplied from the synchronizing signal separation circuit 28, a frame pulse generator 72 supplies a frame pulse sequence to a flip-flop circuit 73. The flip-flop circuit 73 produces a switching signal that is put in a first state in every other frame period and a second state in the remaining ones of the frame periods.

Supplied with the horizontal synchronizing signal H, a flip-flop 88 is set and reset to produce a first demultiplied signal having a repetition frequency equal to a half of the inverse number of the second predetermined period. The first demultiplied signal is supplied to a phase comparator 78 to produce a control signal. The oscillator 80 is controlled by the control signal to supply the oscillation signal synchronized with the horizontal synchronizing signal H to the phase divider 82 and a counter 81. The counter 81 demultiplies the oscillation signal into one by the odd number to derive a second demultiplied signal of a repetition frequency equal to the first demultiplied signal. The oscillator 80 generates the oscillation signal locked to the odd integral multiple of a half of the inverse number of the second predetermined period. The oscillation signal is supplied to a phase divider 82 to produce a first and a second signal equal in frequency to each other. The second signal to antiphase relative to the first signal. Responsive to the switching signal, a switching circuit 83 switches one of the first and second signals to the other at every frame period to produce a phase-adjusted signal. The phase-adjusted signal is supplied to an amplitude modulator 84. Accompanied by a preliminary signal processor 85, the modulator 84 produces the dot-superposed components, which are combined by a mixer 86 with the television signal into a dot-superposed signal described hereinabove. It will readily be understood that the phase-adjusted signal has phases exemplified in FIG. 13 in each frame period.

Figure 16:
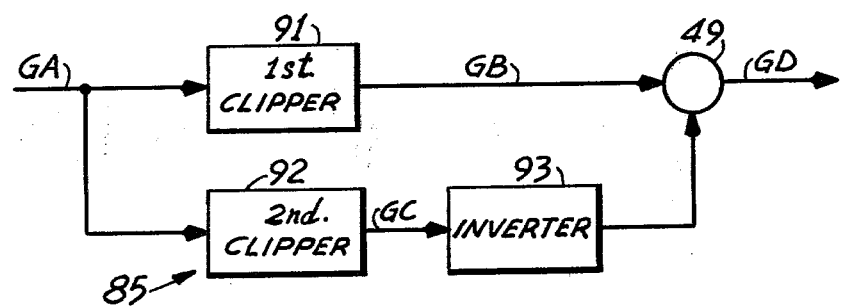
FIG. 16 is a block diagram of a preliminary signal processor used in the circuits illustrated in FIGS. 11 14, and 15.
Figure 17:
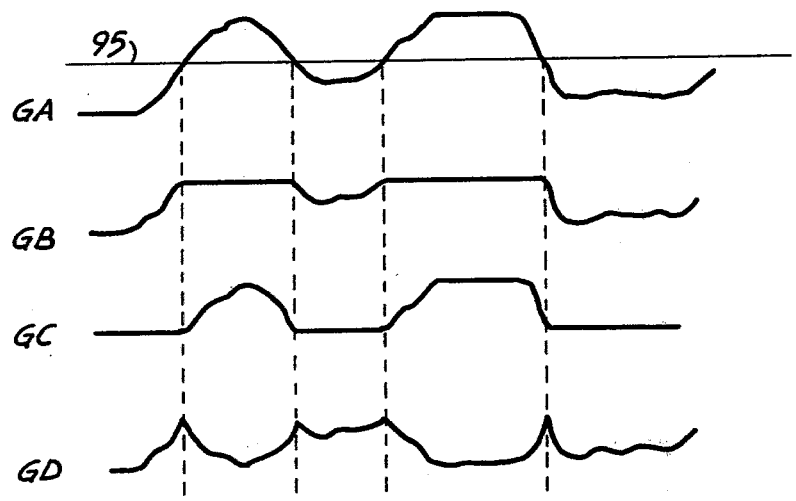
FIG. 17 is a schematic time chart of signals which appear in the preliminary signal processor illustrated in FIG. 16.

Referring to FIGS. 16 and 17, a preliminary signal processor 85 applicable to circuits according to the second, third, and fourth embodiments of this invention comprises a first clipper 91 for clipping those levels of the television signal GA or of the signal groups which are above a preselected level intermediate between the first and second levels to produce a first clipped signal GB. A second clipper 92 clips those levels of the television signal GA which are below the preselected level to produce a second clipped signal GC, which is inverted by an inverter 93 into a clipped and inversed signal. A mixer 94 combines the first clipped signal GB and the clipped and inversed signal into a modified signal GD mentioned hereinabove. In FIG. 17, the preselected level is a level 95 bisecting the level distance between the first and second levels. As illustrated in FIG. 17, the modified signal GD has a maximum level at the preselected level and a minimum level at the first and second levels.

Figure 18:
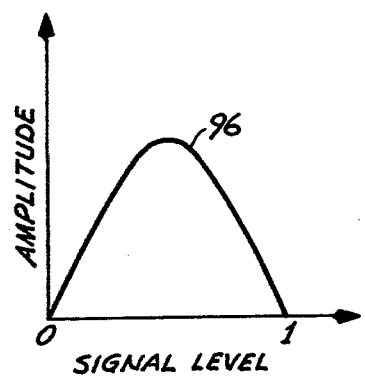
FIG. 18 is a graphical representation of a characteristic of the preliminary signal processor illustrated in FIG. 16.

Referring to FIG. 18, levels of the modified signal GD produced by the preliminary signal processor 85 illustrated with reference to FIGS. 16 and 17 are decided as shown by a curve 96 in compliance with the levels of the television signal GA. Numerals "0" and "1" are representative of black and white levels, respectively. It may be mentioned here that the preselected level of the first clipper 91 may be different from that of the second clipper 92. In addition, both of the preselected levels may be optionally selected for the first and second clippers 91 and 92. By this way, the curve 96 is capable of being changed in accordance with the input television signal.

Figure 19:
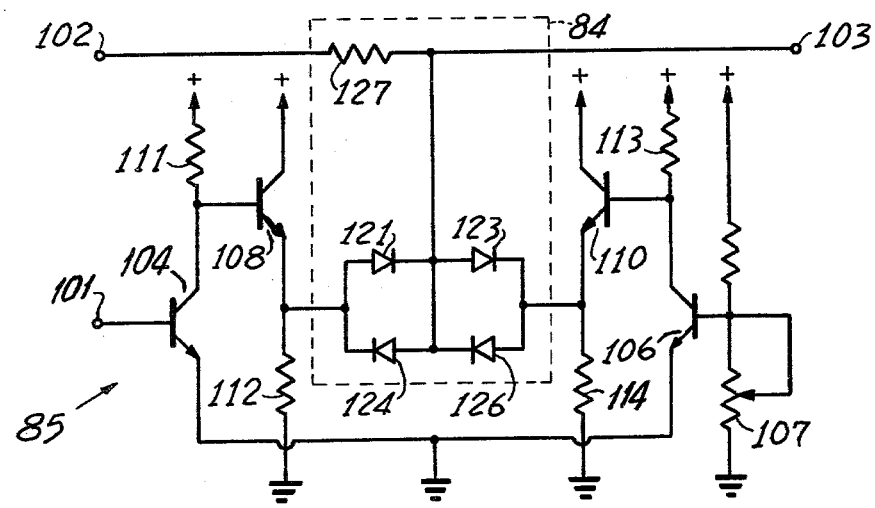
FIG. 19 is a circuit diagram of a modulator circuit used as a preliminary signal processor and an amplitude modulator in the circuits illustrated in FIGS. 11, 14, and 15.

Referring to FIG. 19 a modulator circuit is a combination of the amplitude modulator 84 and the preliminary signal circuit 85. The preliminary signal circuit 85 receives a television signal at a first input terminal 101. The phase-adjusted signal is given from the switching circuit 83 to a second input terminal 102. The modulated signal is delivered to an output terminal 103. The preliminary signal circuit 85 comprises a first pair of transistors 104 and 106 responsive to a signal level of the television signal and a d.c. level. A variable resistor 107 is controlled so that the d.c. level becomes substantially equal to a half of a whole level between white and black levels of the television signal. The first pair of transistors 104 and 106 are operative as a comparator. A comparison result signal is supplied from the comparator to the diode circuit of the amplitude modulator 84 through emitter followers comprising transistors 108 and 110. Connected to a base and an emitter of the transistor 108, resistors 111 and 112 are equal in resistance to resistors 113 and 114 connected to a base and an emitter of the transistor 110, respectively. Comparing the signal level with the preselected d.c. level, the comparator produces as the comparison result signal a first result signal when the signal level is equal to the preselected level and a second result signal when the signal level is whichever of the white and black levels. The comparator further produces as the comparison result signal a third result signal varying between the first and second result signals when the signal level is intermediate between the preselected level and the white levels and between the preselected level and the black level. The diode circuit comprises a first and a second branch comprising, in turn, a first and second pair of diodes 121, 123 and 124, 126 connected between the emitters of transistors 108 and 110. The first diode pair 121 and 123 are in an inverse direction of the second diode pair 124 and 126. The phase-adjusted signal is supplied to points of connection between the diodes 121 and 123 and between 124 and 126 through a resistor 127. The emitters of the transistors 108 and 110 are substantially equal in electrical potential relative to each other when the first signal is supplied from the comparator. Therefore, the diode circuit is put in a substantially nonconductive state. The phase-adjusted signal is supplied to the output terminal 103 through the amplitude modulator 84 without any attenuation. When the signal level approaches the white level from the preselected level, a collector current increases in the transistor 104 and decreases in the transistor 106 to produce the third result signal which appears as differences between the emitter potentials of the transistors 108 and 110. Under the circumstances, the emitter potential of the transistor 110 is higher than that of the transistor 108. As a result, a forward voltage is impressed to the second diode pair 124 and 126 to cause a current to flow. The phase-adjusted signal is attenuated by the diode circuit in compliance with the signal level to supply an amplitude modulated signal to the output signal 103. When the signal level changes toward the black level, the first diode pair 121 and 123 are rendered conductive by the third result signal. The selected signal is also amplitude modulated by the diode circuit. On the contrary, when the signal is equal to either the white or the black level, the second or first diode pair are put in a most conductive state by the second result signal supplied from the comparator. An impedance of each of the diode pair is readily rendered less than several ohms by causing a large current to flow. Under the circumstances, the amplitude of the modulated signal becomes substantially zero at the white and black levels in conjunction with the resistance value of the resistor 127. As is apparent from the above description, the diode circuit is put in a conductive state intermediate between the substantially nonconductive state and the most conductive state when receiving the third result signal.

Figure 20:
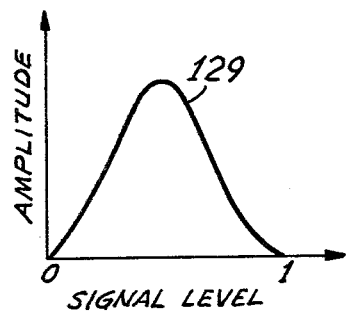
FIG. 20 is a graphical representation of a characteristic of the modulator circuit illustrated in FIG. 19.

Referring to FIG. 20, wherein the abscissa and ordinate represent a signal level of a television signal and an output signal amplitude, a curve 129 shows a modulation characteristic of the modulator circuit illustrated with reference to FIG. 19. As in FIG. 18, the numerals "1" and "0" are representative of the white and black levels of the television signal. The curve 129 has gentle slopes at regions adjacent to the white and black levels and a peak amplitude at a center level intermediate between the white and black levels. The gentle slope is dependent on forward voltage to current characteristics of the diodes. In addition, it is possible with the use of diodes, such as silicone diodes, having a high forward voltage, to widen the peak amplitude portion towards the first and second signal levels.

Figure 21:
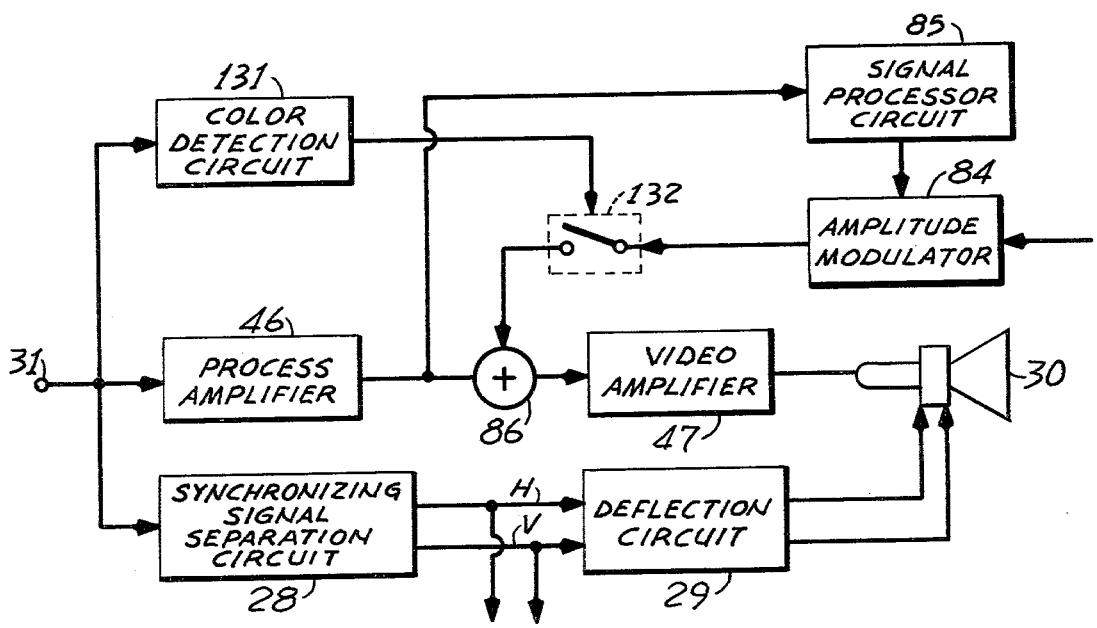
FIG. 21 is a block diagram of a circuit according to a fifth embodiment of this invention.

Finally referring to FIG. 21, a circuit according to a fifth embodiment of the invention is applicable to the second, third, and fourth embodiments illustrated with reference to FIGS. 11, 14, and 15. Elements and signals similar to those of FIGS. 11, 14, and 15 are designated by like reference symbols. In this figure, the circuit is partially illustrated because the remaining portions are substantially equivalent to those of FIGS. 11, 14, and 15. The circuit is for whichever of a monochrome and a color television signal of the type described hereinabove. It is to be noted in connection with circuits according to the second, third and fourth embodiments of this invention that a reduction is inevitable in picture quality when the circuits are supplied with the color television signal. This is due to beat components between the subcarrier signals and the phase-adjusted signals when the color television signal is received in the circuits. The circuit according to the fifth embodiment thereof comprises a color detection circuit 131 connected to the input terminal 31 and a switching circuit 132 between the amplitude modulator and the mixer to avoid the influence of the beat components. Supplied with the television signal through the input terminal 31, the color detection circuit 131 detects the color television signal to produce a control signal when the color television signal is supplied to the circuit. The control signal is supplied to the switching circuit 132. The switching circuit 132 puts the mixer 86 into operation in the absence of the control signal and out of operation in the presence of the control signal. Therefore, the modulated signal if is prevented from being supplied from the amplitude modulator 84 to the mixer 86 when the color television signal is received. The color television signal is directly displayed on the cathode-ray tube 30 through the process amplifier 46, the mixer 86 and the video amplifier 47. The color detection circuit 131 may be for detecting color bursts included in the color television signal to produce the control signal.

In the above embodiments, use is made of the television signal of the interlaced scanning having the first predetermined period equal to a half of the frame period. This invention is equally well applicable to a television signal of a sequential scanning having the first predetermined period equal to a whole of the frame period. The cathode-ray tube may be one for displaying two dimensional images or an optical fiber tube for displaying one dimensional images. The elements, such as 32 and so forth, for providing a copy of the picture displayed on the cathode-ray tube 30 may be of any of the known types.

What is claimed is:

1. A circuit for use in a device comprising a cathode-ray tube responsive to a cathode-ray tube input signal for displaying a picture and means for forming a monochrome copy of said picture on a copying medium, said circuit being responsive to a sequence of discrete signal blocks included in a television signal for producing said cathode-ray tube input signal, said television signal comprising vertical synchronizing signals at a first predetermined period, horizontal synchronizing signals between two adjacent ones of said vertical synchronizing signals at a second predetermined period, and luminance components between two adjacent ones of said horizontal synchronizing signal, said signal blocks having signal levels variable between a first and a second level, said first and second levels inclusive, each of said signal blocks comprising the luminance components included in said television signal in a preselected interval longer than said second predetermined period and not longer than twice said first predetermined period, said picture having luminance levels dependent on said cathode-ray tube input signal, wherein the improvement comprises:

first means responsive to at least one of said signal blocks for producing a succession of dot superposed signals in a succession of the preselected intervals, respectively, said dot superposed signals comprising at least one of said signal blocks, the dot-superposed signal produced in each of the preselected intervals of said succession further comprising a plurality of dot signals superposed on those portions of the signal block included in the dot-superposed signals of said succession in said each preselected interval which have the signal levels intermediate between said first and second levels, each of said dot signals in each of the preselected intervals being substantially inphase with the respective dot signals in at least one of said preselected intervals that next follows the last-mentioned each interval; and second means for delivering said dot-superposed signal from said first means as said cathode-ray tube input signal.

2. A circuit as claimed in claim 1, said first predetermined period being equal to a preselected one of a half and a whole of a frame period of said television signal, wherein said circuit further comprises:

an oscillator controlled by said horizontal synchronizing signals for producing an oscillation signal of an oscillation frequency equal to a predetermined integral multiple of a half of an inverse number of said second predetermined period and of a phase synchronized with said horizontal synchronizing signals; and means responsive at least to said vertical synchronizing signals for adjusting the phase of said oscillation signal to produce a phase-adjusted signal wherein the phase which said oscillation signal has in each of said second predetermined periods is rendered the same as the phase which said oscillation signal has said frame period after said each second predetermined period;

said first means comprising:

modulator means for amplitude modulating said phase-adjusted signal in accordance with said sequence of the signal blocks to produce an amplitude modulated signal having a minimum amplitude when the signal level of said signal blocks reaches whichever of said first and second levels and having otherwise a maximum amplitude; and a mixer for mixing said amplitude modulated signal and said sequence of the signal blocks to produce said dot-superposed signal.

3. A circuit as claimed in claim 2, said first predetermined period being equal to a half of said frame period and to a field period of said television signal, said predetermined integral multiple being an even integral multiple, wherein said adjusting means comprises:

means responsive to said oscillation signal for producing a first and a second signal, said second signal being antiphase relative to said first signal;

switching signal producing means responsive at least to said vertical synchronizing signals for producing a switching signal that is put in a first state in prescribed ones of said second predetermined periods of the respective frame periods and a second state in the remaining ones of said second predetermined periods; and switching means responsive to said switching signal for selecting as said phase-adjusted signal said first signal when said switching signal is put in said first state and said second signal when said switching signal in put in said second state.

4. A circuit as claimed in claim 3, wherein said switching signal producing means comprises signal selecting means responsive to said vertical and horizontal synchronizing signals for putting said switching signal in said first state in every other one of said second predetermined periods of the respective frame periods and in said second state in the remaining ones of said second predetermined periods.

5. A circuit as claimed in claim 4, wherein said signal selecting means comprises:

means for demultiplying said vertical synchronizing signals to produce a first demultiplied signal at said frame period;

means for demultiplying said horizontal synchronizing signals to produce a second demultiplied signal at twice said second predetermined period; and means responsive to said first and second demultiplied signals for producing said switching signal.

6. A circuit as claimed in claim 3, wherein said switching signal producing means comprises means responsive to said vertical synchronizing signals alone for putting said switching signal in said first state in every other field period and in said second state in the remaining field periods.

7. A circuit as claimed in claim 2, said first predetermined period being equal to a half of said frame period and to a field period of said television signal, said predetermined integral multiple being an odd integral multiple, wherein said adjusting means comprises:

means responsive to said oscillation signal for producing a first and a second signal, said second signal being antiphase relative to said first signal;

switching signal producing means responsive to said vertical synchronizing signals for producing a switching signal that is put in a first state in every other frame period and a second state in the remaining ones of said frame periods; and switching means responsive to said switching signal for selecting said first signal when said switching signal is put in said first state and said second signal when said switching signal is put in said second state.

8. A circuit as claimed in claim 2, said signal levels including a preselected level intermediate between said first and second levels, wherein said modulator means comprises:

preliminary means responsive to said sequence of the signal blocks for producing a modified signal having a maximum level at said preselected level and otherwise levels lower than said maximum level; and an amplitude modulator for amplitude modulating said phase-adjusted signal by said modified signal.

9. A circuit as claimed in claim 8, wherein said preliminary means comprises:

a first clipper for clipping those signal levels of said signal blocks which are above said preselected level to produce a first clipped signal;

a second clipper for clipping those signal levels of said signal blocks which are below said preselected level to produce a second clipped signal;

an inverter for inversing said second clipped signal to produce a clipped and inversed signal; and a mixer for mixing said first clipped signal and said clipped and inversed signal to produce said modified signal.

10. A circuit as claimed in claim 2, said signal levels including a preselected level intermediate between said first and second levels, wherein said modulator means comprises:

comparator means for comparing said signal levels with said preselected level to produce a first result signal when said signal level is equal to said preselected level, a second result signal when said signal level is whichever of said first and second levels, and a third result signal varying between said first and second result signals when said signal levels are intermediate between said preselected level and said first level and between said preselected level and said second level;

a diode circuit put in a substantially nonconductive state in response to said first result signal, in a most conductive state in response to said second result signal, and in a conductive state intermediate between said substantially nonconductive and said most conductive states in response to said third result signal; and means coupled to said diode circuit and responsive to said phase-adjusted signal for producing said modulated signal.

11. A circuit as claimed in claim 2, said television signal being whichever of a monochrome and a color television signal, said color television signal comprising subcarrier signals modulated by chrominance components, said signal blocks further comprising said modulated subcarrier signals when said circuit is supplied with said color television signal, wherein said circuit further comprises:

detection means responsive to the television signal said circuit is supplied with for detecting said color television signal to produce a control signal when said color television signal is supplied to said circuit; and means for putting said mixer into operation in the absence of said control signal and out of operation in the presence of said control signal.

12. A circuit as claimed in claim 11, said modulated subcarrier signals comprising color bursts, wherein said detection means consists of means responsive to said color bursts for producing said control signal.

* * * * *

UNITED STATES PATENT AND TRADEMARK OFFICE
CERTIFICATE OF CORRECTION

PATENT NO. : 4,205,340

DATED : May 27, 1980

INVENTOR(S) : Akiyoshi Kouno et al.

It is certified that error appears in the above-identified patent and that said Letters Patent is hereby corrected as shown below:

On the Title Page insert:

-- (30) Foreign Application Priority Data

October 27, 1976   (JP)   Japan...51-129903

October 28, 1976   (JP)   Japan...51-130219  --.

Signed and Sealed this

*Fourteenth* Day of *September 1982*

[SEAL]

*Attest:*

*Attesting Officer*    GERALD J. MOSSINGHOFF
                                    *Commissioner of Patents and Trademarks*